(12) United States Patent
Chen et al.

(10) Patent No.: US 9,811,889 B2
(45) Date of Patent: Nov. 7, 2017

(54) METHOD, APPARATUS AND COMPUTER PROGRAM PRODUCT FOR GENERATING UNOBSTRUCTED OBJECT VIEWS

(71) Applicant: Nokia Technologies Oy, Espoo (FI)

(72) Inventors: Xin Chen, Evanston, IL (US); Andi Zang, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 42 days.

(21) Appl. No.: 14/587,892

(22) Filed: Dec. 31, 2014

(65) Prior Publication Data

US 2016/0189408 A1  Jun. 30, 2016

(51) Int. Cl.
G09G 5/00 (2006.01)
G06T 5/00 (2006.01)
G06T 5/50 (2006.01)

(52) U.S. Cl.
CPC .............. *G06T 5/006* (2013.01); *G06T 5/005* (2013.01); *G06T 5/50* (2013.01); *G06T 2207/20221* (2013.01)

(58) Field of Classification Search
CPC .............................. G09G 5/14; G09G 2340/10
USPC ......................................................... 345/629
See application file for complete search history.

(56) References Cited

U.S. PATENT DOCUMENTS

| | | | |
|---|---|---|---|
| 2008/0165187 A1* | 7/2008 | Marugame | G06T 17/10 345/420 |
| 2009/0110239 A1 | 4/2009 | Chen et al. | |
| 2010/0201682 A1* | 8/2010 | Quan | G06K 9/00704 345/419 |
| 2013/0069944 A1* | 3/2013 | Altman | G06T 17/05 345/420 |
| 2013/0124471 A1* | 5/2013 | Chen | H04N 5/23238 707/624 |
| 2015/0029182 A1* | 1/2015 | Sun | G06T 15/04 345/419 |
| 2015/0235350 A1* | 8/2015 | Kwan | G06T 5/002 382/254 |

OTHER PUBLICATIONS

R. Koch, M. Pollefeys, and L. Van Gool. Multi viewpoint stereo from uncalibrated video sequences. In H. Burkhardt and B. Neumann, editors, Computer Vision—ECCV '98 (Pmc. 5th European Conf. on Computer Vision, vol. I), vol. 1406 of Lecture Notes in Computer Science, pp. 55-71. Springer-Verlag, 1998.*

(Continued)

*Primary Examiner* — Jin Ge
(74) *Attorney, Agent, or Firm* — Alston & Bird LLP

(57) ABSTRACT

A method is provided for generating street-level imagery to provide unobstructed images, such as images of facades of a building, for use in on-line street viewing, three dimensional city rendering, research, or building based localization, among other uses. In particular, example methods may include obtaining a plurality of images of a first side of an object from a plurality of points-of-view, normalizing each of the plurality of images to obtain a plurality of normalized images of the first side of the object, where each of the plurality of normalized images includes a plurality of pixels, each with image location coordinates within a respective image. Method may further generate a merged image of the first side of the object, where the merged image is generated by comparing pixels between the plurality of normalized images with matching image location coordinates.

12 Claims, 10 Drawing Sheets

(56) References Cited

OTHER PUBLICATIONS

World | Building | EMPORIS [online] [retrieved Apr. 6, 2015]. Retreived from the Internet: <URL: http://www.emporis.com/buildings>. (dated 2000-2015) 2 pages.

* cited by examiner

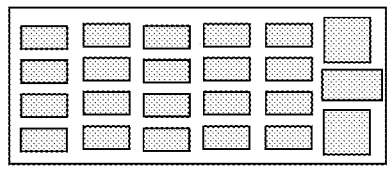
290
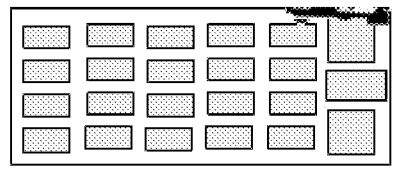
280
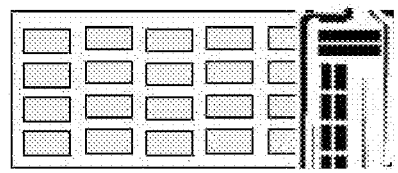
270
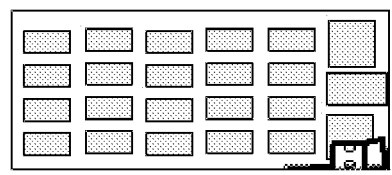
260
FIG. 9

METHOD, APPARATUS AND COMPUTER PROGRAM PRODUCT FOR GENERATING UNOBSTRUCTED OBJECT VIEWS

TECHNICAL FIELD

Example embodiments of the present invention relate generally to generating a view of an object from a plurality of points of view and, in particular to generating an unobstructed view of an object, such as the façade of a building.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are increasingly becoming small, portable computing devices that are capable of running a variety of applications and providing a user with a display on which they may watch video, view web pages, play interactive games, or read text. Devices are often small enough to fit into a pocket to achieve desired portability of these devices; however, as the capabilities of the devices increases, the displays of such devices are used to display large amounts of information and view objects which have traditionally been displayed on larger, less portable displays. Mobile devices are often used for navigation purposes to determine travel routes or the location of a particular address. Satellite imagery and street-level imagery may be integrated into mapping and navigation applications such that a user may see an image of their destination or point of interest as would be viewed from a street or pathway. It may be desirable to provide an enhanced visualization and interaction method using satellite and/or street-level images to enhance a user experience through on-line street views and three-dimensional city rendering.

BRIEF SUMMARY

In general, example embodiments of the present invention provide an improved method of generating street-level imagery to provide unobstructed images, such as images of facades of a building. In particular, the method of example embodiments provides for obtaining a plurality of images of a first side of an object from a plurality of points-of-view, and normalizing each of the plurality of images to obtain a plurality of normalized images of the first side of the object, where each of the plurality of normalized images includes a plurality of pixels, each with image location coordinates within a respective image. Methods may further generate a merged image of the first side of the object, where the merged image is generated by comparing pixels between the plurality of normalized images with matching image location coordinates. Generating the merged image may include generating an average value of the pixels of the plurality of normalized images with matching location coordinates to generate a pixel value of the merged image at each of the respective image location coordinates. Generating the merged image may include generating a median value of the pixels of the plurality of normalized images with matching location coordinates to generate a pixel value of the merged image at each of the respective image location coordinates.

According to some embodiments, normalizing each of the plurality of images to obtain a plurality of normalized images may include determining a plane defined by the first side of the object within the image, determining a boundary within the plane defined by the first side of the object within the image, and rectifying the image of the first side of the object to produce a two-dimensional view of the first side of the object from a perspective normal to the plane defined by the first side of the object as the normalized image. Determining a boundary within a plane defined by the first side of the object may include obtaining object information from a database, where object information may include object location and object dimensions. Determining a boundary within the plane defined by the first side of the object within the image may include using the object location and object dimensions to generate a boundary within the plane defined by the first side of the object. Rectifying the image of the first side of the object may include applying at least one of a shift, rotation, scale, or affine transformation to the image.

Example embodiments of the present invention may provide an apparatus including at least one processor and at least one memory including computer program code. The at least one memory and the computer program code are configured to, with the at least one processor, cause the apparatus to obtain a plurality of images of a first side of an object from a plurality of points-of-view and normalize each of the plurality of images to obtain a plurality of normalized images of the first side of the object, where each of the plurality of normalized images includes a plurality of pixels, each pixel with image location coordinates within a respective image. Embodiments may further cause the apparatus to generate a merged image of the first side of the object, where the merged image is generated by comparing pixels between the plurality of normalized images with the matching image location coordinates. Causing the apparatus to generate the merged image may optionally include causing the apparatus to generate an average value of the pixels of the plurality of normalized images with matching image location coordinates to generate a pixel value of the merged image at each of the respective image location coordinates. Causing the apparatus to generate the merged image may optionally include causing the apparatus to generate a median value of the pixels of the plurality of normalized images with matching image location coordinates to generate a pixel value of the merged image at each of the respective image location coordinates.

According to some embodiments, causing the apparatus to normalize each of the plurality of images to obtain a plurality of normalized images may include causing the apparatus to determine a plane defined by the first side of the object within the image, causing the apparatus to determine a boundary within the plane defined by the first side of the object within the image, and causing the apparatus to rectify the image of the first side of the object to produce a two-dimensional view of the first side of the object from a perspective normal to the plane defined by the first side of the object as the normalized image. Causing the apparatus to determine a boundary within the plane defined by the first side of the object within the image may include causing the apparatus to use the object location and object dimensions to generate a boundary within the plane defined by the first side of the object. Causing the apparatus to rectify the image of the first side of the object may include causing the apparatus to apply at least one of a shift, rotation, scale, or affine transformation to the image.

Embodiments of the present invention may provide a computer program product with at least one non-transitory computer-readable storage medium having computer-executable program code stored therein. The computer-executable program code instructions may include program code instructions for obtaining a plurality of images of a first side of an object from a plurality of points-of-view, and program code instructions for normalizing each of the plurality of images to obtain a plurality of normalized images of the first side of the object, where each of the plurality of normalized images comprises a plurality of pixels, each pixel with image location coordinates within a respective image. Embodiments may include program code instructions for generating a merged image of the first side of the object, where the merged image is generated by comparing pixels between the plurality of normalized images with matching image location coordinates. The program code instructions for generating the merged image may include program code instructions for generating an average value of the pixels of the plurality of normalized images with matching image location coordinates to generate a pixel value of the merged image at each of the respective image location coordinates. The program code instructions for generating the merged image may include program code instructions for generating a merged value of the pixels of the plurality of normalized images with matching image location coordinates to generate a pixel value of the merged image at each of the respective image location coordinates.

According to some embodiments, the program code instructions for normalizing each of the plurality of images to obtain a plurality of normalized images may include program code instructions for determining a plane defined by the first side of the object within the image, program code instructions for determining a boundary within the plane defined by the first side of the object within the image, and program code instructions for rectifying the image of the first side of the object to produce a two-dimensional view of the first side of the object from a perspective normal to the plane defined by the first side of the object as the normalized image. The program code instructions for determining a boundary within a plane defined by the first side of the object may include program code instructions for obtaining object information from a database, where the object information includes object location and object dimensions. Determining a boundary within the plane defined by the first side of the object within the image may include using a location of the object and dimensions of the object to generate a boundary within the plane defined by the first side of the object.

Example embodiments of the present invention may include means for obtaining a plurality of images of a first side of an object from a plurality of points-of-view, and means for normalizing each of the plurality of images to obtain a plurality of normalized images of the first side of the object, where each of the plurality of normalized images includes a plurality of pixels, each with image location coordinates within a respective image. Embodiments may further include means for generating a merged image of the first side of the object, where the merged image is generated by comparing pixels between the plurality of normalized images with matching image location coordinates. The means for generating the merged image may include means for generating an average value of the pixels of the plurality of normalized images with matching location coordinates to generate a pixel value of the merged image at each of the respective image location coordinates. The means for generating the merged image may include means for generating a median value of the pixels of the plurality of normalized images with matching location coordinates to generate a pixel value of the merged image at each of the respective image location coordinates.

According to some embodiments, the means for normalizing each of the plurality of images to obtain a plurality of normalized images may include means for determining a plane defined by the first side of the object within the image, means for determining a boundary within the plane defined by the first side of the object within the image, and means for rectifying the image of the first side of the object to produce a two-dimensional view of the first side of the object from a perspective normal to the plane defined by the first side of the object as the normalized image. The means for determining a boundary within a plane defined by the first side of the object may include means for obtaining object information from a database, where object information may include object location and object dimensions. The means for determining a boundary within the plane defined by the first side of the object within the image may include means for using the object location and object dimensions to generate a boundary within the plane defined by the first side of the object. The means for rectifying the image of the first side of the object may include applying at least one of a shift, rotation, scale, or affine transformation to the image.

BRIEF DESCRIPTION OF THE DRAWINGS

Figure 1:
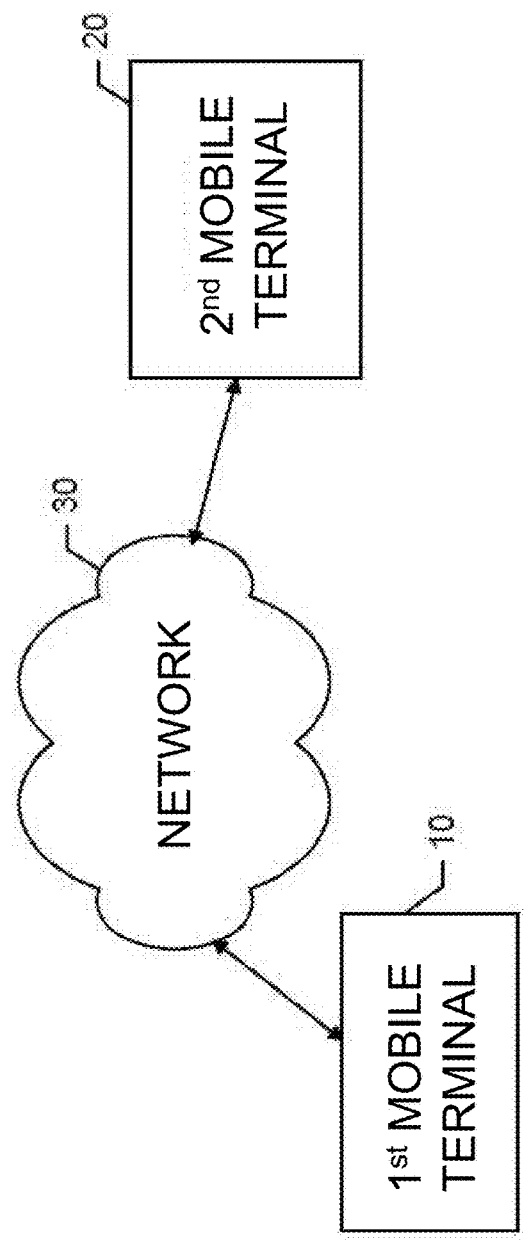
Figure 2:
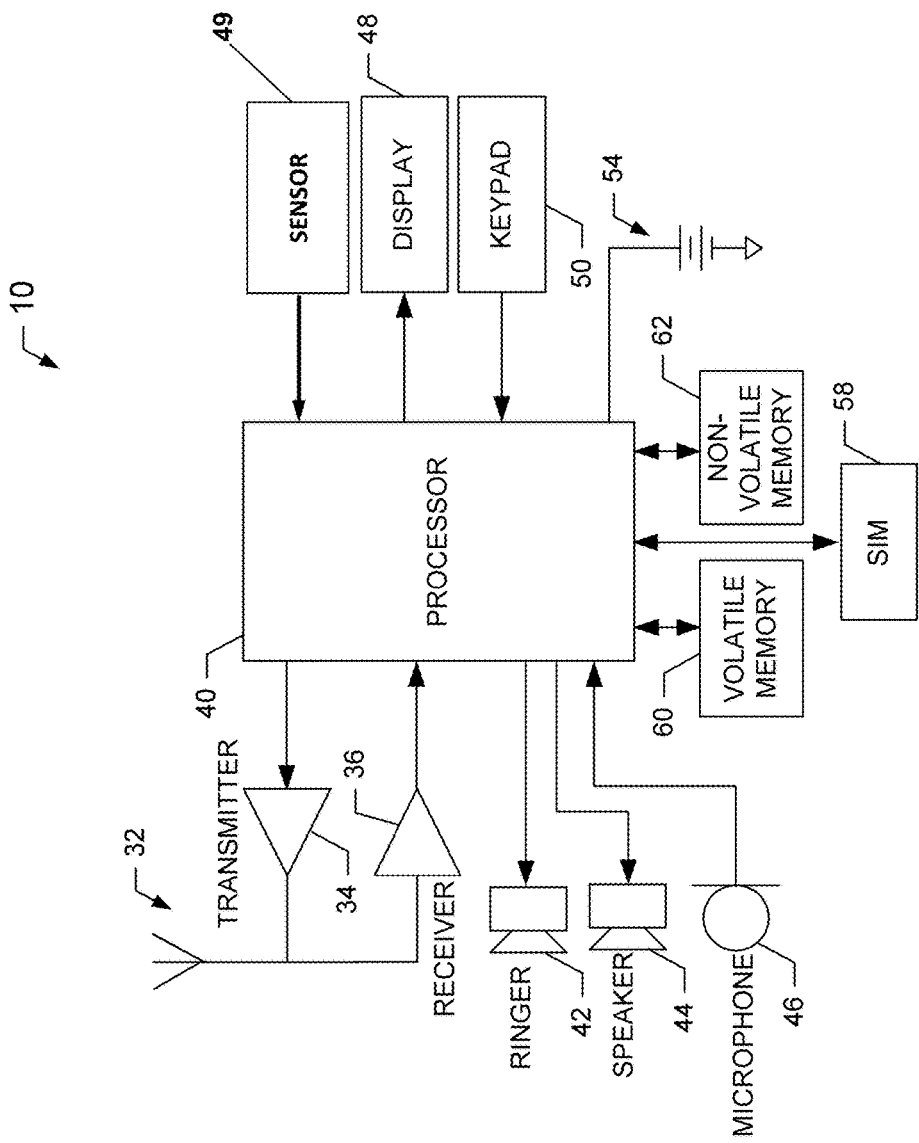
Figure 3:
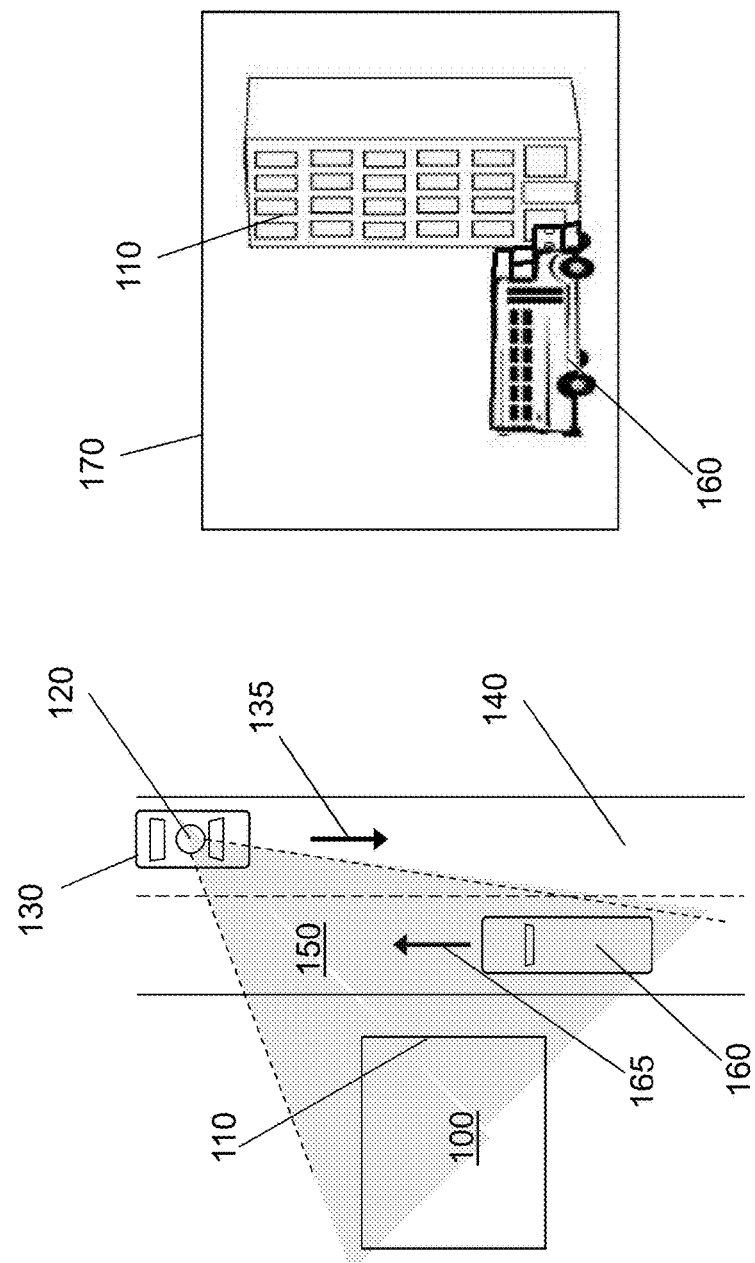
Figure 4:
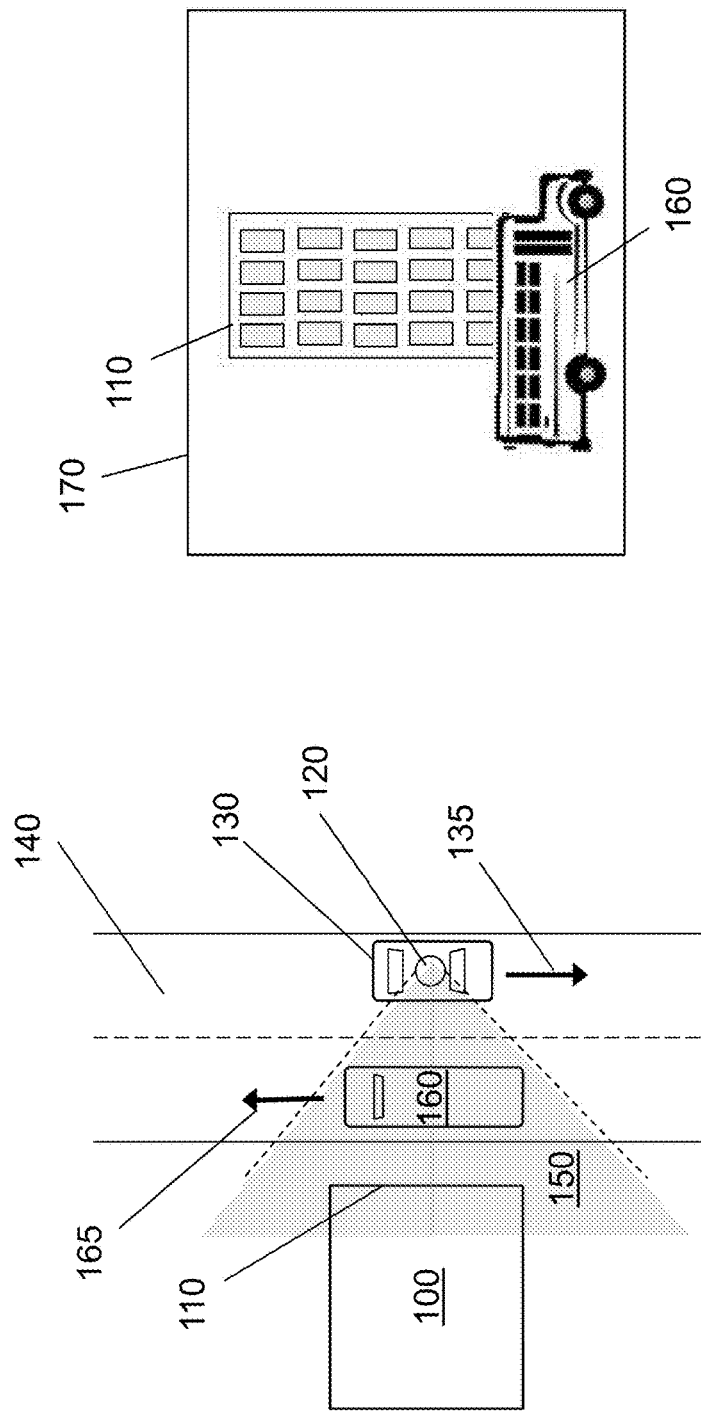
Figure 5:
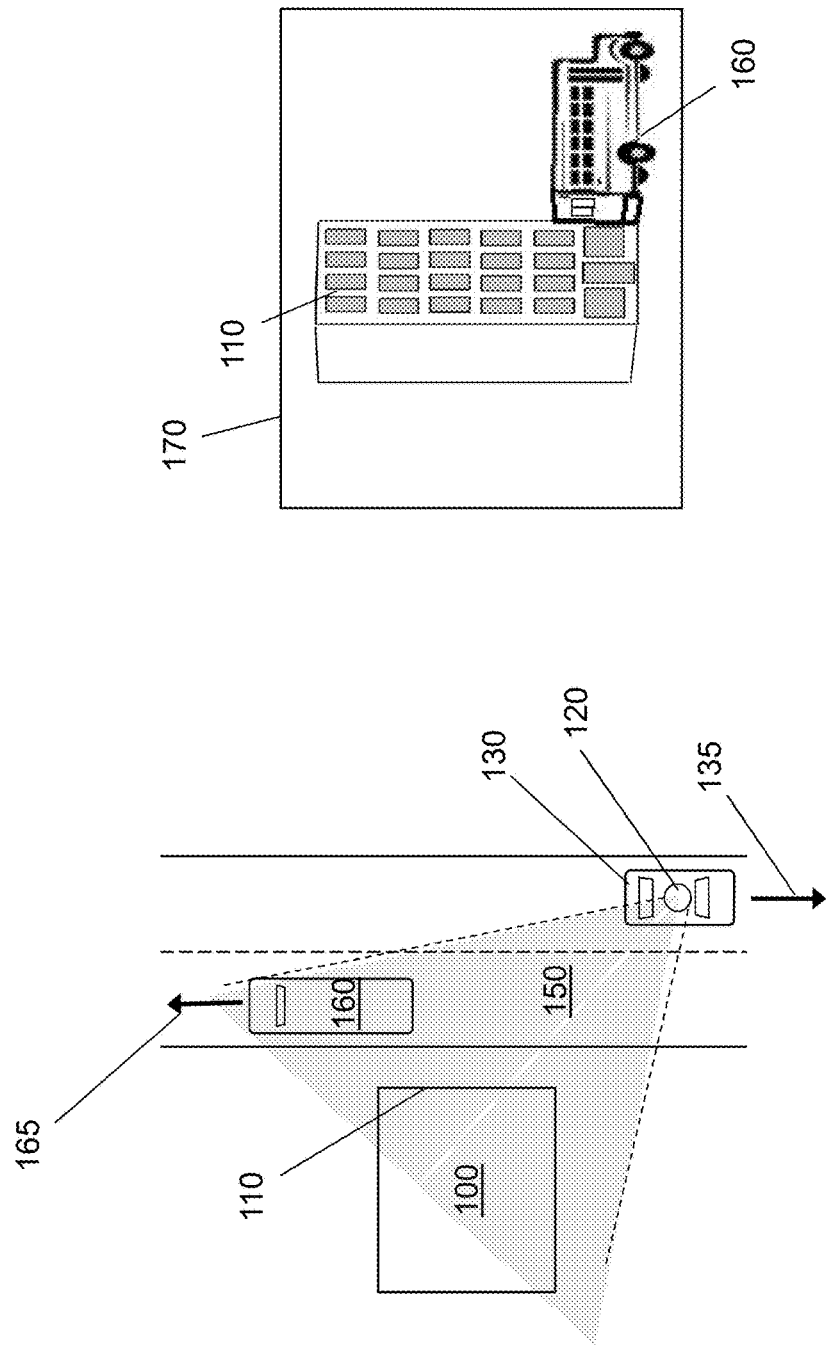
Figure 6:
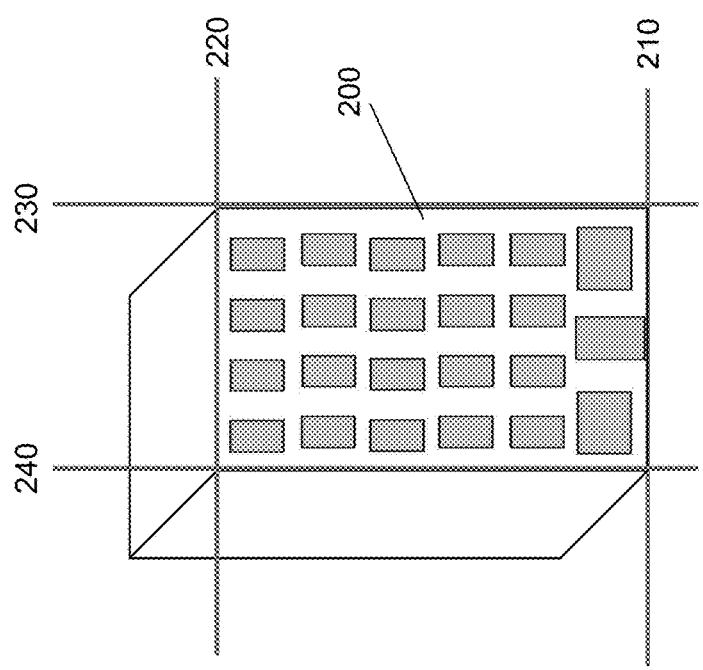
Figure 7:
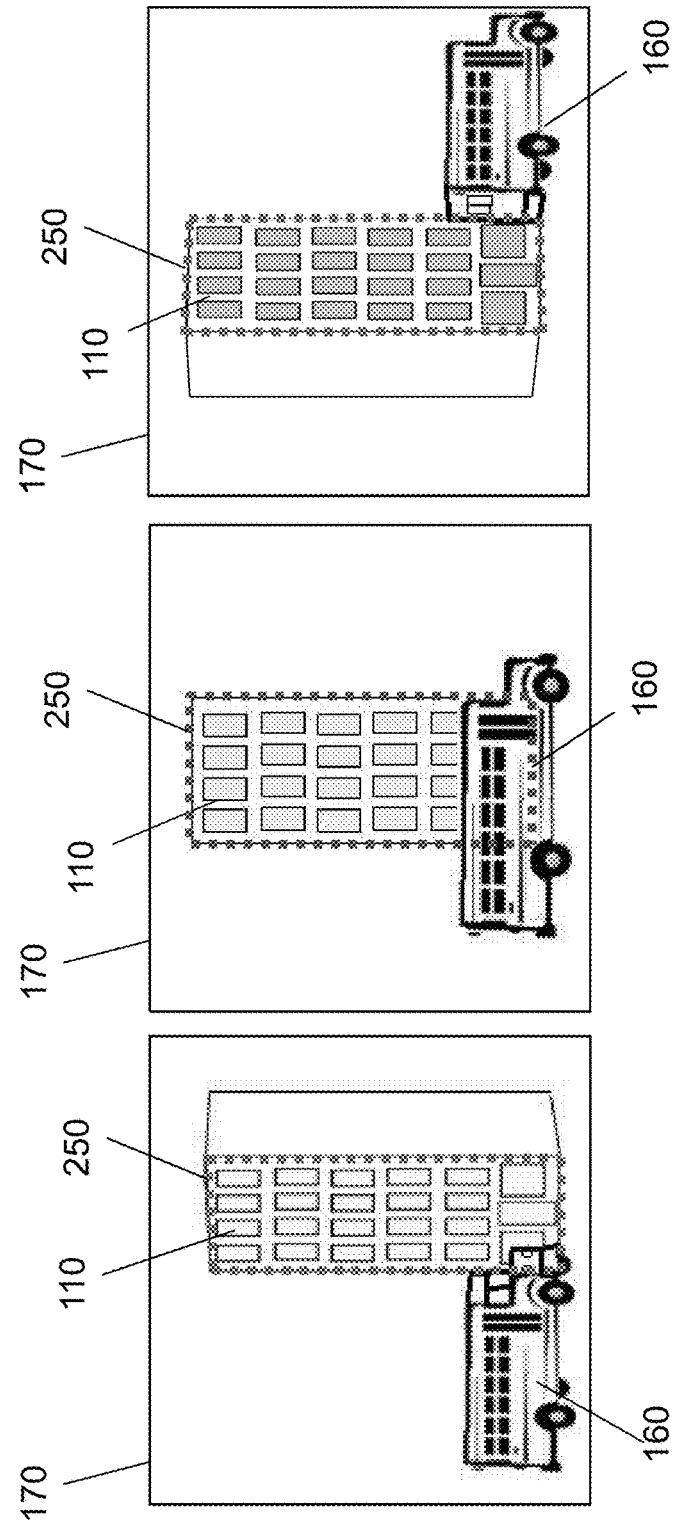
Figure 8:
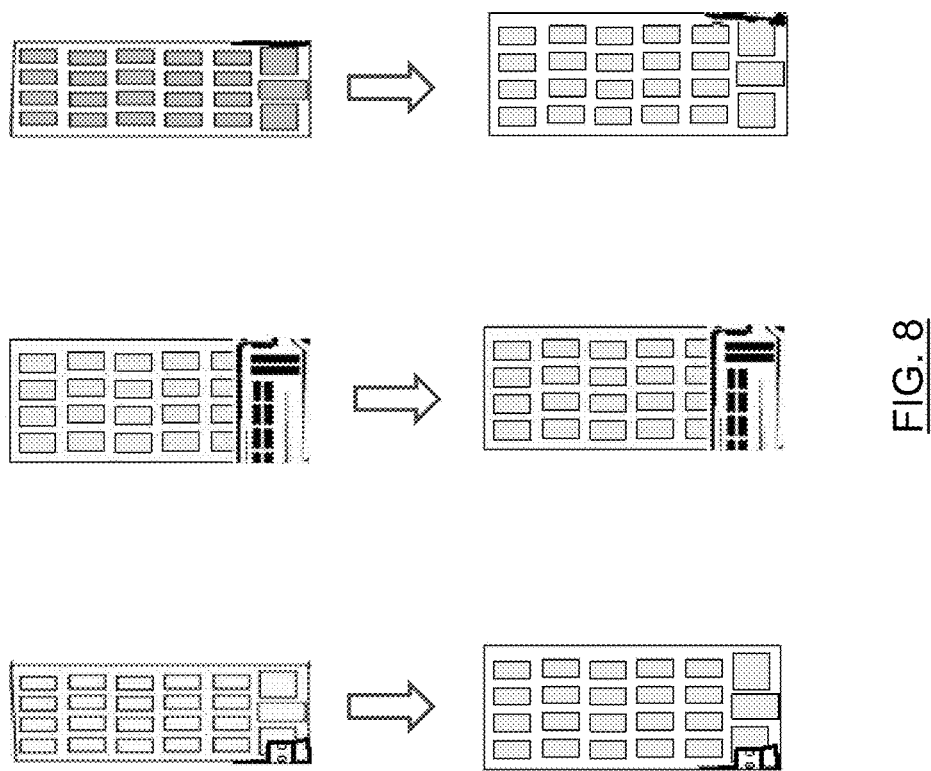
Figure 10:
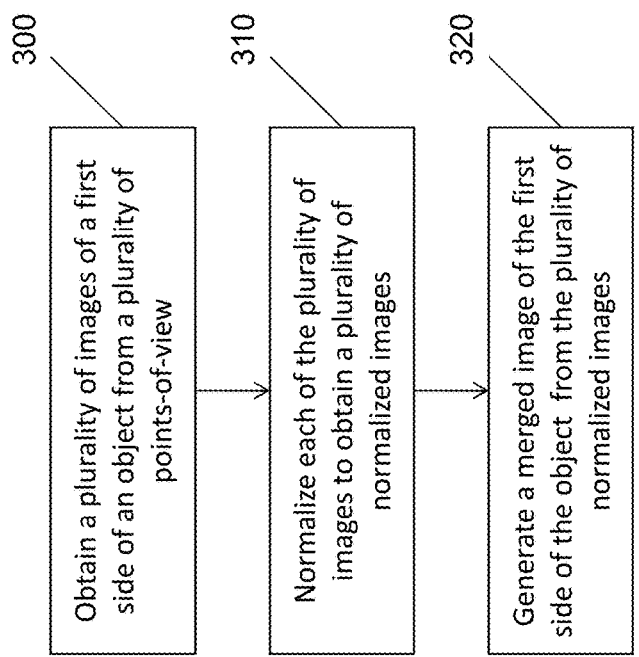

Having thus described example embodiments of the invention in general terms, reference will now be made to the accompanying drawings, which are not necessarily drawn to scale, and wherein:

FIG. 1 illustrates an communication system in accordance with an example embodiment of the present invention;

FIG. 2 is a schematic block diagram of a mobile device according to an example embodiment of the present invention;

FIG. 3 illustrates an image captured of a first side of an object from a first point-of-view according to an example embodiment of the present invention;

FIG. 4 illustrates an image captured of a first side of an object from a second point-of-view according to an example embodiment of the present invention;

FIG. 5 illustrates an image captured of a first side of an object from a third point-of-view according to an example embodiment of the present invention;

FIG. 6 depicts boundary generation for the first side of the object according to an example embodiment of the present invention;

FIG. 7 depicts boundary generation and image extraction for the images captured from the various points-of-view of FIGS. 3-5 according to an example embodiment of the present invention;

FIG. 8 illustrates image normalization for the extracted images from the images captured from the various points-of-view of FIGS. 3-5 according to an example embodiment of the present invention;

FIG. 9 depicts the merging of the normalized images of FIG. 8 according to an example embodiment of the present invention; and FIG. 10 is a flowchart of a method for generating an unobstructed view of the first side of an object according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Example embodiments of the present invention may include a mobile terminal which is operable on a network for receiving location data and retrieving information related to a navigation application or program on the mobile terminal through a session. A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals such as the mobile terminal 10 and the second mobile terminal 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

Although the mobile terminal 10 may be configured in various manners, one example of a mobile terminal that could benefit from embodiments of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. One such example communication device may include a vehicle-mounted terminal for data gathering, as will be described with respect to the example embodiments detailed below and illustrated in the figures. As described, the mobile terminal may include various means for performing one or more functions in accordance with embodiments of the present invention, including those more particularly shown and described herein. It should be understood, however, that a mobile terminal may include alternative means for performing one or more like functions, without departing from the spirit and scope of the present invention.

The mobile terminal (e.g., mobile terminal 10) may, in some embodiments, be a computing device configured to employ an example embodiment of the present invention. However, in some embodiments, the mobile terminal may be embodied as a chip or chipset. In other words, the mobile terminal may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile terminal may therefore, in some cases, be configured to implement an embodiment of the present invention on a single chip or as a single "system on a chip." As such, in some cases, a chip or chipset may constitute means for performing one or more operations for providing the functionalities described herein.

The mobile terminal 10 illustrated in FIG. 2 may include an antenna 32 (or multiple antennas) in operable communication with a transmitter 34 and a receiver 36. The mobile terminal may further include a processor 40 that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved-UMTS terrestrial radio access network), with fourth-generation (4G) wireless communication protocols or the like.

It is understood that the apparatus may include circuitry implementing, among others, audio and logic functions of the mobile terminal 10. The processor may be embodied in a number of different ways. For example, the processor may be embodied as various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like), a hardware accelerator, and/or the like.

In an example embodiment, the processor 40 may be configured to execute instructions stored in the memory device 60 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to an embodiment of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing an embodiment of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 10 may also comprise a user interface including an output device such as an earphone or speaker 44, a ringer 42, a microphone 46, a display 48, and a user input interface, which may be coupled to the processor 40. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output. The mobile terminal 10 may also include a sensor 49, such as an accelerometer, motion sensor/detector, temperature sensor, or other environmental sensor to provide input to the processor indicative of a condition or stimulus of the mobile terminal 10.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, i.e., cell id identity or cell id information, with which the mobile terminal is in communication.

In general, example embodiments of the present invention provide a method for generating images of an object, such as a building, and more particularly, to generating images of an object without obstruction of the object. For example, images may be captured of the façade of a building from various perspectives or points-of-view. Such image capture may be performed, for example, by a mobile terminal 10, which may be configured to capture street-view images along a particular route using an image sensor, such as sensor 49. Capturing street-view images along a route generally involves the periodic capture of pictures from various angles as a mobile terminal advances along the route. The periodic nature of the image capture may be adjusted such that the frequency of image capture is determined based, in part, on the speed of the mobile terminal capturing the images along the route. As these images are captured periodically without necessarily awaiting an unobstructed view or possibly even without user interaction for each image, the captured images may include objects obstructing the view of the objects that are intended to be captured by the mobile terminal 10.

While the term "street" is used herein to describe a physical location that is depicted in the images and visualization, it is to be understood that the "street" may be any road, pathway, or other navigable thoroughfare (e.g., canals, rivers, hiking trails, bike paths, alleys, highways, or the like) which may benefit from example embodiments of the present invention. Embodiments of the present invention may be used for a variety of applications including on-line street views and three-dimensional city rendering, generating a building façade dataset for research purposes, and/or other applications such as building based localization.

Existing navigation and mapping programs may provide a user with a map view, a satellite view, and a street-level view. The map view may resemble a traditional cartographer map with lines and symbols representing roads and objects on the map. The satellite view may present a user with a photographic representation of the location as photographed by a satellite. Both the satellite view and the map view may be able to be zoomed in and out to provide the desired level of detail to a user and the map and satellite views may be combinable to provide a different level of detail to a user. As the satellite view is taken from a satellite hundreds of miles from the ground level, the images provided are of limited detail and the perspective of these images is generally from substantially directly overhead such that limited to no detail is available about objects along the sides of the streets as they would appear to a person on the street.

The street-level view may provide a user with a view as if the user was standing in the street and viewing up or down the street, or to either the left or right side of the street. Street-level views are typically available only in increments or steps of anywhere from tens of feet to hundreds of feet. When a user is viewing a street-level view, the user is only able to view a limited level of detail and only within the viewpoint in which they are virtually positioned. Available imagery is typically panoramic in data, and a naïve visualization involves rendering the panoramas at a chosen location. Moving location, or browsing around then requires downloading and re-rendering the new panorama at each location, which may be slow due to the size of each downloaded panoramic image. Further, objects obstructing buildings, landmarks, or the like in a street-view may preclude a user from viewing details that may be important to them.

Embodiments of the present invention may minimize the influence of objects obstructing the view of a building, landmark, or the like, without requiring determination that an obstruction is present. Embodiments described herein may be applied uniformly to street-view images in order to generate more accurate, detailed image information automatically without requiring manual user review and editing.

FIGS. 3-5 illustrate an example embodiment of a method of street-view image capture of the first side of an object. In the instant embodiment, the "first side" is the façade 110 of building 100. A mobile terminal 120, which may be traveling on or with a vehicle 130, may be moving along a street 140 in the direction of arrow 135. The mobile terminal 120 may capture an image of the façade 110 of the building 100 within the camera field of view represented by cone 150. The camera may be an image sensor such as sensor 49 shown in FIG. 2. In the illustrated embodiment, a bus 160 may be traveling along street 140 in a direction represented by arrow 165, opposite the direction of vehicle 130. The captured image 170 is also illustrated in FIG. 3 depicting the building façade 110. The bus 160 is also visible in the image 170.

FIG. 4 illustrates the vehicle 130 having traveled further down the street 140 in the direction of arrow 135, while the bus 160 has moved in the direction of arrow 165. The camera field of view 150 may capture an image of the façade 110 of the building 100; however, the bus 160 may occlude at least a portion of the façade 110. The captured image 170 illustrates the façade 110 as obstructed by the bus 160. While the field of view of the camera 150 of FIG. 4 is different than that of FIG. 3, the mobile terminal 120 may include multiple cameras arranged at different angles with respect to the vehicle 130. In such an embodiment, the illustrated fields of view of the cameras of FIGS. 3-5 may be captured by different image sensors 49 which may be associated with one or more mobile terminals 10. The fields of view 150 illustrated in FIGS. 3-5 may be captured by a single camera or by a plurality of cameras arranged at different angles; however, the only field of view shown is that including a view of the façade of the building 100 for ease of understanding. Further, while only three captured images are shown in the sequence of FIGS. 3-5, there may be as few as two images captured with no upper-limit to the number of images captured. The total number of images captured of a particular object may be based on a number of factors including the periodic image capture rate, the speed of the mobile terminal, the processing capacity of embodiments of an apparatus processing the images, etc.

FIG. 5 illustrates a field of view 150 of the mobile terminal 120 as the vehicle 130 continues along the street 140 in the direction of arrow 135. The field of view 150 including the façade of the building 110 also includes a portion of the bus 160. The captured image 170 is illustrated in FIG. 5 depicting the building façade in a perspective view as the mobile terminal 120 has passed by the building 100.

None of the captured images of FIGS. 3-5 depict a clear, unobstructed view of the façade 110 of the building 100 as viewed from a viewpoint normal to a plane defined by the façade. However, it may be desirable to present an unobstructed view of the façade 110 of the building 100 for a cohesive and user-friendly street-view of the building. Example embodiments of the present invention may be configured to generate an unobstructed view of the façade 110 of the building from a viewpoint normal to a plane defined by the façade using the images of the building 100 captured, despite some of these images containing objects obstructing the view of the building façade 110.

According to example embodiments of the present invention, the object obstructing a view of a target object, in the illustrated embodiment a building façade 110, need not be detected or determined in order to generate an unobstructed view of the target object. Further, while the illustrated embodiment of FIGS. 3-5 depicts three captured images, embodiments described herein may be implemented with any number of captured images provided there are at least two images, and preferably more than two captured images. Building Geographic Properties Calculation in Street View According to an example embodiment of the present invention, a bounding box of a façade image in a street view may be determined in order to establish an object in an image that can be normalized, for example by processor 40, as further described below. To generate a bounding box of a façade image, the geographic properties of a building may be calculated from a street view dataset. A mobile terminal, such as mobile terminal 120 of FIGS. 3-5, may capture three-dimensional (3D) point cloud information and two-dimensional (2D) images at the same time via one or more sensors, such as sensor 49 of FIG. 2. The 3D point cloud information may be detected using a scan of the environment. Additional information, such as global positioning system (GPS) location and sensor orientation of the mobile terminal may also be used to help generate a bounding box of a façade image. The GPS location and sensor orientation may be obtained, for example, through a sensor 49 of FIG. 2, where the sensor can include a GPS antenna/receiver and/or a gyroscopic sensor for orientation determination. Further, building geographic information may be obtained from other sources, such as through the Emporis building directory (www.emporis.com/buildings), to obtain GPS location, building height information, façade materials, etc. Using information from one or more of these sources, as illustrated in FIG. 6, a building façade bottom boundary 210, top boundary 220, right boundary 230, and left boundary 240, may be determined in each of the images captured.

Optionally, other image-based data may be used to help generate the boundaries of a building façade in an image, such as image analysis. Image analysis may be used to determine boundaries based upon image contrast, color changes, or other features within an image that may signify or suggest the boundaries of a building façade. For example, if a building is established to have a particular color of façade based on information from a database, the bounds of that building may be determined, at least in part, by a change in façade color from the expected color to that of what is determined to be an adjacent building. While the image analysis may be automated and performed by a processor, such as processor 40 of mobile terminal 10, in instances where boundaries cannot be readily determined through any of the available information or through image analysis, embodiments of the present invention may use manual intervention to identify, for example, corners of a building's façade in order to accurately define the boundaries. While manual intervention may be rarely needed, the degree of certainty of boundary detection/determination may be varied or user-determined in order to minimize the number of instances in which manual intervention is required.

For example, using GPS information (determined through a GPS receiver/antenna such as sensor 49), mobile terminal orientation (determined via gyroscopic sensor, accelerometer, or the like), image processing (via processor 40), 3D point cloud information (received via sensor, such as sensor 49), or any combination thereof may result in a boundary that is established with 90% certainty. In such an example, the boundary may be accepted as being accurate. However, if using the available information results in a boundary that is established with only a 40% degree of certainty, the series of images may be flagged for follow up or manual intervention to positively define the object boundaries. The degree of certainty required for the automatic establishment of the boundaries of an object may be varied by a user based on experience as too high of a threshold may require too much manual intervention, while too low of a threshold may result in incorrect boundary establishment.

It is understood that many buildings do not have a rectangular façade shape. Embodiments of the present invention may be equally as applicable to such buildings, with the boundaries established as an envelope in which the building façade is located. In such embodiments, the environment of the building that is captured within the rectangular boundaries may form part of the resultant merged image described below. Further, embodiments may include building façade boundaries that are not arranged in a rectangle. For example, if a building has an established façade shape, such as the U.S. Capitol building, where the façade shape is available in a database, the boundaries may be established from the known façade shape using defined points of the façade.

Building Façade Image Extraction and Normalization

Once the boundaries of an object building façade have been established, for example, by processor 40, the building façade image may be extracted in order to rectify or normalize the image to use in establishing a more complete and accurate building façade image. FIG. 7 illustrates the building façade boundaries 250 as determined by the processor from the images captured in FIGS. 3-5 using, for example, sensor 49 as an image sensor. The building façade boundaries 250 may define the façade plane position, which may optionally be informed by the position of the façade established in the 3D point cloud and/or the orientation of the mobile terminal 10 relative to the building façade, as may be determined by GPS or by image analysis.

With the building façade plane position known or presumed to be known, the building façade images may be normalized to a front-view plane, which is a view of the building façade as viewed from a position normal to the building façade plane in front of the building facade. The normalization may be performed by the processor 40 using one or more of an affine transformation, a shift, rotation, or scale. FIG. 8 illustrates the normalization of each of the images of the façade 110 of the building 100. The normalization by the processor shifts the image, applies an affine transformation, a rotation or scale, as appropriate to normalize the image of the façade 110 to replicate a view of the façade from a position normal to the plane defined by the façade. However, as there is no determination made as to whether the façade is obstructed or not, any obstructions present in the captured image within the established boundaries of the image of the façade remain in the image after it has been normalized.

Normalized Façade Image Calibration and Merging

Normalization of images, while producing a relatively accurate facsimile of the object or, in the aforementioned example, building façade 110, may include errors that result from the shift, rotate, scaling, or affine transformation operations. These errors may be mitigated through calibration in order to improve a merged image produced from the normalized images. Calibration may be performed by processor 40, through the determination of corresponding point pairs between an image and a datum image, and to calculate and fit a projective transformation. The selection of a datum image is imperative to proper calibration. A datum image is the image with minimum error in the image. A datum image may be established as, for example, the image that is captured at the desired viewpoint, which in the embodiment described herein includes a position normal to the plane defined by the façade 110 of the building 100. Thus, the image captured in the position of FIG. 4 may be established as the datum image for the façade, despite having an obstruction to the image of the façade. The datum image may be used to properly align the plurality of images in order to generate a merged image.

A merged image may be generated, for example by processor 40 of mobile terminal 10, using the normalized images from the plurality of images captured of the building façade 110, using for example sensor 49 as an image sensor, to obtain an image that is less likely to include an obstruction. The normalized images may be merged in one or more ways to establish a merged image. For example, each normalized image comprises a plurality of pixels, with each pixel having image location coordinates within the image. In a 2D image, the coordinates may generally be an X-coordinate and a Y-coordinate. The pixel at a first image location coordinate may be compared with the pixels of the plurality of other images at the corresponding image location coordinate by the processor 40. A "merged" pixel may be established as, for example, the average value of the pixels at that image location coordinate as calculated by the processor. Optionally, the merged pixel may be established as the median value of the pixels at that image location coordinate as calculated by the processor 40. This operation may be performed by the processor for each set of coordinates within the plurality of images to establish an average or median value of a pixel at each coordinate. The merged image is comprised of pixels of the average or median value at each image location coordinate. FIG. 9 represents the merging of the normalized images from the images captured in FIGS. 3-5 to reach a merged image.

The normalized version of the image of the façade 110 captured in FIG. 3 is illustrated at 260, while the normalized version of the image of the façade 110 captured in FIG. 4 is illustrated at 270. The normalized version of the image of the façade 110 captured in FIG. 5 is shown as 280. The merging of these images, via a processor such as processor 40, yields the merged image 290 depicting a view of the façade from a perspective normal to the plane defined by the façade. While the aforementioned example describes comparing individual pixels and establishing an average or mean, optionally, a group of pixels can be considered together and compared together to a group of pixels in a plurality of other images to establish an average or mean for the group of pixels. Such an example may be useful to decrease resources required for generating a merged image and may provide benefits similar to those used in conventional jpeg compression formatting.

While the above-described example embodiment is directed toward establishing a merged image with a view from a perspective normal to the plane defined by the façade, the same methods can be used to establish views of an object from any perspective. The views can be normalized to a view that is not necessarily normal to the established plane. Optionally, views can be normalized to a view that is normal to the established plane, and then transformed to a view that is not normal to the established plane. The merged image is generated to take an average value for a pixel in order to minimize the potential for an object to be obstructing the target object of the image. Optionally, a pixel value may be a median value, a weighted value, or a minimized value, such that the value of a pixel at any given location is not necessarily averaged to generate the merged image. Pedestrians, vehicles, trees, or other objects may obstruct a view in one image, but may not obstruct the views in all images, and may be "averaged out" of the merged image thereby presenting a more consistent image of the target object.

FIG. 10 is a flowchart illustrative of a system, method and program product according to example embodiments of the invention. The flowchart operations may be performed by a mobile terminal, such as mobile terminal 10 shown in FIG. 2, as operating over a communications network such as that shown in FIG. 1. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

An example embodiment of a method for generating an unobstructed view of an object is depicted in the flowchart of FIG. 10. According to the depicted method, a plurality of images of a first side of an object may be obtained from a plurality of points-of-view at 300. Each of the plurality of images may be normalized to obtain a plurality of normalized images at 310. Each of the plurality of normalized images may include a plurality of pixels, each pixel having image location coordinates within a respective image. A merged image of the first side of the object may be generated from the plurality of normalized images by comparing pixels between the plurality of normalized images with matching coordinates at 320.

In an example embodiment, an apparatus for performing the method of FIG. 10 above may comprise a processor (e.g., the processor 40) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 40 and/or a device or circuit for executing instructions or executing an algorithm for processing information as described above.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    obtaining a plurality of images of a first side of an object from a plurality of points-of-view;
    normalizing each of the plurality of images to obtain a plurality of normalized images of the first side of the object, wherein each of the plurality of normalized images comprises a plurality of pixels, each pixel with image location coordinates within a respective image, and wherein at least one of the plurality of images of the first side of the object from the respective plurality of points-of-views comprises an obstructing object, and, the normalizing of each of the plurality of images comprising:
    determining a plane defined by the first side of the object within the image; obtaining object information from a database, wherein the object information comprises object location and object dimensions;
    determining a boundary within the plane defined by the first side of the object within the image, wherein the boundary is determined based on the object location and the object dimensions; and
    rectifying the image of the first side of the object to produce a two-dimensional view of the first side of the object from a perspective normal to the plane defined by the first side of the object as the normalized image; and
    generating a merged image of the first side of the object, wherein the merged image is generated by comparing each of the pixels between each of the plurality of normalized images with matching image location coordinates, wherein generating the merged image of the first side of the object comprises reducing an obstruction without determining that the obstruction is present in the plurality of images of the first side of the object from the plurality of points-of-views, and results in excluding the obstructing object from the merged image; and
    causing display of the generated merged image.

2. The method according to claim 1, wherein generating the merged image further comprises generating an average value of the pixels of the plurality of normalized images with matching image location coordinates to generate a pixel value of the merged image at each of the respective image location coordinates.

3. The method according to claim 1, wherein generating the merged image further comprises generating a median value of the pixels of the plurality of normalized images with matching image location coordinates to generate a pixel value of the merged image at each of the respective image location coordinates.

4. The method of claim 1, wherein rectifying the image of the first side of the object comprises applying at least one of a shift, rotation, scale, or affine transformation to the image.

5. The method of claim 1, wherein generating the merged image of the first side of the object comprises utilizing pixels from all of the plurality of normalized images with matching image location coordinates.

6. An apparatus comprising at least one processor and at least one memory including computer program code, the at least one memory and the computer program code configured to, with the at least one processor, cause the apparatus to at least perform:
    obtain a plurality of images of a first side of an object from a plurality of points-of-view;
    normalize each of the plurality of images to obtain a plurality of normalized images of the first side of the object, wherein each of the plurality of normalized images comprises a plurality of pixels, each pixel with image location coordinates within a respective image, and wherein at least one of the plurality of images of the first side of the object from the respective plurality of points-of-views comprises an obstructing object, and, wherein causing the apparatus to normalize each of the plurality of images comprises causing the apparatus to:
    determine a plane defined by the first side of the object within the image; obtain object information from a database, wherein the object information comprises object location and object dimensions;
    determine a boundary within the plane defined by the first side of the object within the image, wherein the boundary is determined based on the object location and the object dimensions; and
    rectify the image of the first side of the object to produce a two-dimensional view of the first side of the object from a perspective normal to the plane defined by the first side of the object as the normalized image; and
    generate a merged image of the first side of the object, wherein the merged image is generated by comparing each of the pixels between each of the plurality of normalized images with matching image location coordinates, wherein generating the merged image of the first side of the object comprises reducing an obstruction without determining that the obstruction is present in the plurality of images of the first side of the object from the plurality of points-of-views, and results in excluding the obstructing object from the merged image; and
    cause display of the generated merged image.

7. The apparatus according to claim 6, wherein causing the apparatus to generate the merged image further comprises causing the apparatus to generate an average value of the pixels of the plurality of normalized images with matching image location coordinates to generate a pixel value of the merged image at each of the respective image location coordinates.

8. The apparatus according to claim 6, wherein causing the apparatus to generate the merged image further comprises causing the apparatus to generate a median value of the pixels of the plurality of normalized images with matching image location coordinates to generate a pixel value of the merged image at each of the respective image location coordinates.

9. The apparatus according to claim 6, wherein causing the apparatus to rectify the image of the first side of the object comprises causing the apparatus to apply at least one of a shift, rotation, scale, or affine transformation to the image.

10. A computer program product comprising at least one non-transitory computer-readable storage medium having computer-executable program code instructions stored therein, the computer-executable program code instructions comprising:

program code instructions for obtaining a plurality of images of a first side of an object from a plurality of points-of-view;

program code instructions for normalizing each of the plurality of images to obtain a plurality of normalized images of the first side of the object, wherein each of the plurality of normalized images comprises a plurality of pixels, each pixel with image location coordinates within a respective image, wherein at least one of the plurality of images of the first side of the object from the respective plurality of points-of-views comprises an obstructing object, and, wherein the program code instructions for normalizing each of the plurality of images comprises:

program code instructions for determining a plane defined by the first side of the object within the image; program code instructions for obtaining object information from a database, wherein the object information comprises object location and object dimensions;

program code instructions for determining a boundary within the plane defined by the first side of the object within the image, wherein the boundary is determined based on the object location and the object dimensions; and program code instructions for rectifying the image of the first side of the object to produce a two-dimensional view of the first side of the object from a perspective normal to the plane defined by the first side of the object as the normalized image; and program code instructions for generating a merged image of the first side of the object, wherein the merged image is generated by comparing each of the pixels between each of the plurality of normalized images with matching image location coordinates, wherein generating the merged image of the first side of the object comprises reducing an obstruction without determining that the obstruction is present in the plurality of images of the first side of the object from the plurality of points-of-views, and results in excluding the obstructing object from the merged image; and program code instructions for causing display of the generated merged image.

11. The computer program product according to claim 10, wherein the program code instructions for generating the merged image further comprises program code instructions for generating an average value of the pixels of the plurality of normalized images with matching image location coordinates to generate a pixel value of the merged image at each of the respective image location coordinates.

12. The computer program product according to claim 10, wherein the program code instructions for generating the merged image further comprises program code instructions for generating a median value of the pixels of the plurality of normalized images with matching image location coordinates to generate a pixel value of the merged image at each of the respective image location coordinates.

* * * * *